ved Jan. 9, 1973

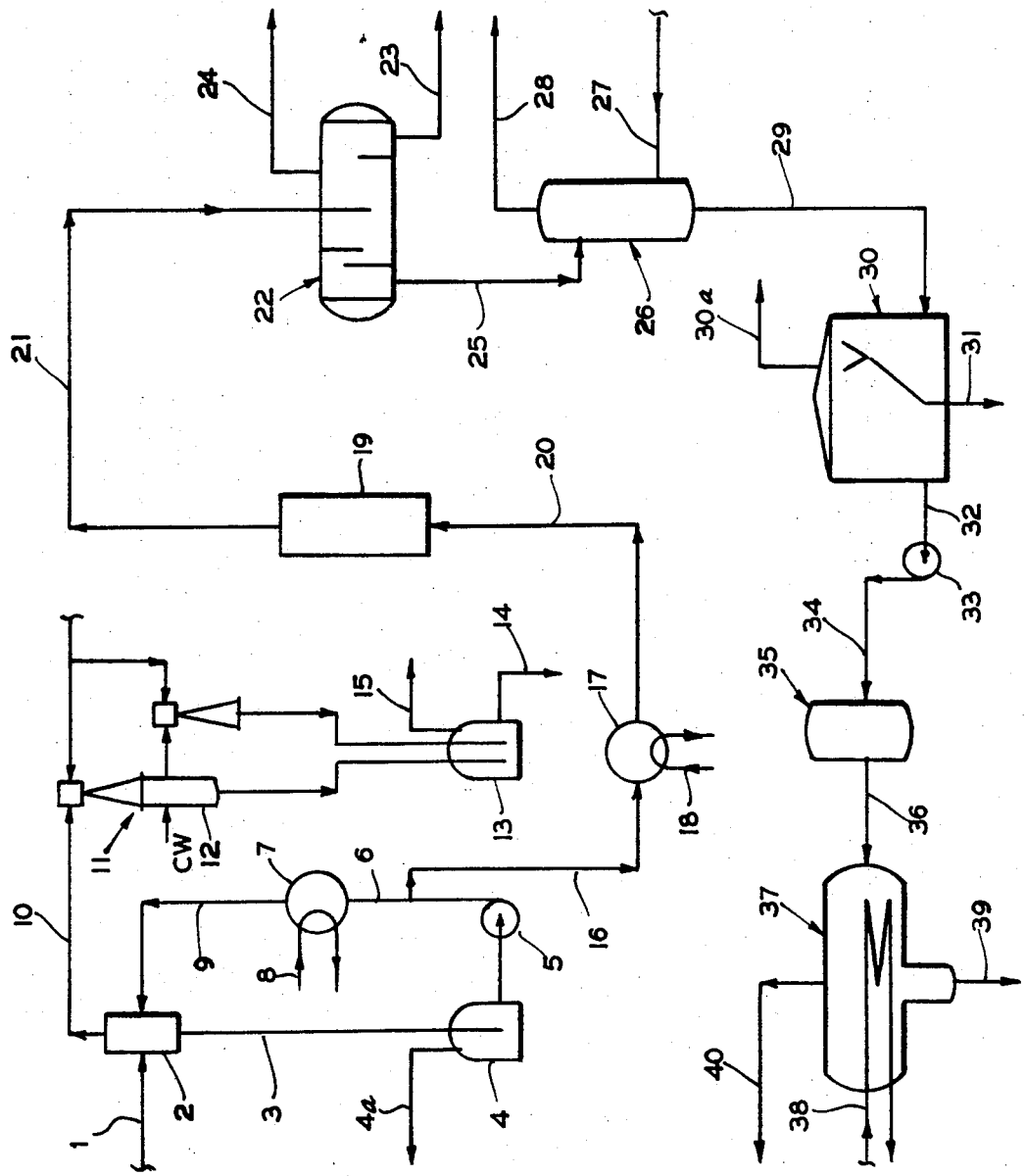

United States Patent Office 3,709,793
Patented Jan. 9, 1973

3,709,793
CONTROL OF ENVIRONMENTAL POLLUTION IN TALL OIL FRACTIONATION
Dellason F. Bress, Murray Hill, N.J., assignor to Foster Wheeler Corporation, Livingston, N.J.
Filed July 10, 1969, Ser. No. 840,723
Int. Cl. B01d 3/00
U.S. Cl. 203—4       7 Claims

ABSTRACT OF THE DISCLOSURE

Tall oil is fractionated with little or no environmental pollution. The stripping steam and the odorous compounds it carries with it are condensed by foul water being recycled through the condenser, an amount of foul water equal to the stripping steam coming into the condenser being purged, revaporized and used again as stripping steam in the fractionation process.

BACKGROUND OF THE INVENTION

The fractionation of tall oil is conventionally carried out under vacuum using stripping steam which carries from the top of the fractionation column the most volatile and therefore the most odorous of the unsaponifiable material in the crude. A condenser communicates with the top of the column to maintain the vacuum and transform most of the stripping steam and low boiling odorous compounds into liquid.

In one type of system being used presently, the condenser is of the barometric type and the cooling water is recirculated foul water from that condenser. After the condenser, the water is usually passed through a settling pond to remove an oil layer after which the water is circulated over a cooling tower and returned to the condenser. The use of a settling pond is advisable since it minimizes gunking of the cooling tower.

A disadvantage to such a system is that it creates an air pollution problem since the cooling tower air strips odors from the oily water. This is true whether or not a settling pond is used. The odor produced is not wholly unpleasant but is extremely strong particularly when redistilling the heads produced to make the prime products. While objectionable, the odor is not considered hazardous and presents no health problem. This type of system reduces to a minimum any problems associated with stream pollution because under most weather conditions the evaporative loss from the cooling tower exceeds the stripping steam added to the system in the barometric condenser. Thus there is no foul waste water except in extended periods of rainy weather.

A two-stage jet with intercondenser usually follows the first condenser. The first condenser removes essentially all the organic contaminants so that a relatively pure stream of non-condensable gases and water enter the two-stage system and the condensate produced by the two-stage system is therefore not objectionable.

Another type of system which is used at the present time is one where vacuum surface condensers are used for the stripping steam. This is slightly more expensive than the barometric type even though the latter requires a separate clean water cooling tower. The surface condenser does eliminate the odor from the cooling tower but a foul stream of condensate equivalent to the stripping steam is produced.

Still another system in present use employs a closed barometric condensing system with a cooler to cool the circulating foul water indirectly with air or water. A purge from the water circulating, equivalent to the stripping steam, is then produced as a polluted stream which requires further treatment.

It can be seen that the tall oil distillation plants in present use create both air and stream pollution problems. Recently the trend has been toward the closed condensing systems. The stream of polluted water resulting from such systems is often treated, but complete purification has been too difficult and expensive to be practicable. Mechanical and chemical treatment systems have been used, but only with limited success. In addition, biological treatments in conventional aerated activated sludge plants have been performed on tall oil wastes.

The polluted water stream even after settling will contain as much as one percent (1%) of dissolved and emulsified organic chemicals. These are mainly unsaponifiable materials as contrasted to the rosin and fatty acid which make up the bulk of the crude tall oil in the distillation system. These include sterols, hydrocarbons, terpenes, alcohols as well as decomposition products resulting from the cracking of fatty acid rosin in the distillation process.

SUMMARY

It is an object of this invention to overcome disadvantages found in the prior art as those discussed above. The polluted stream of waste liquid resulting from the condensation of the stripping stream is eliminated. This is accomplished by treating and recycling the water purge and revaporizing it to once again utilize it as stripping steam in the distillation process.

BRIEF DESCRIPTION OF THE DRAWING

The drawing is a schematic view of the present invention.

DETAILED DESCRIPTION OF THE PREFERRED EMBODIMENT

In the drawing a stream 1 of stripping steam plus contaminants from a fractionation tower (not shown) leads to a condenser 2 which may be of the barometric type. Foul water from the condenser 2 flows through line 3 to a hot well 4 from which a pump 5 circulates it by line 6 to a cooler 7. The cooler 7 is fed coolant through a line 8 which cools the foul water which is then returned to the condenser 2 through line 9.

Noncondensable gases from the hot well 4 are vented by line 4a. Preferably, the gases are not vented directly to the atmosphere but are disposed of by incineration, an elevated stack or by other means which would eliminate any odor.

Noncondensable gases coming out of the condenser 2 through line 10 have water vapor with little if any organic content. The noncondensable gases flowing through line 10 are compressed in a multi-staging steam evaporator system 11 having an interstaging condenser 12 from which the condensates lead to a hot well 13 from which it overflows to a sewer or other water system through line 14. It has already been pointed out that the condensate from the interstaging condenser is not objectionable. Gases from the hot well 13 are disposed of in the same manner as the gases vented through line 4a.

A portion of the circulating water coming out of the pump 5 is purged by line 16. The amount of water which is purged is such that in any given time, it will be approximately equal to the amount of stripping steam condensed in the condenser 2. The water in the line 16 is heated in the heat exchanger 17 which is fed heating medium through a line 18. The heating medium may be steam, flue gas or a hot process stream. Such heating promotes the separation of emulsified organic material when the water is led to a coalescing filter 19 through line 20.

The liquid then flows through line 21 to a decanter 22 which is suitably baffled to separate the organic or oil phase from the water phase. The organic phase leaves through line 23 and may then be added to low-grade fractions produced in the tall oil plant or it may be burned. Gases are vented through line 24 and may be treated in the same manner as the gases which are vented through lines 4a and 15.

The water phase passes through line 25 to a stripper vessel 26 in which a small amount of steam is injected through line 27 to strip odors from the water. The vapor from the stripper 26 passes through line 28 and is preferably treated in the same manner as the gases vented through lines 4a, 15 and 24. Stripped water from the stripper 26 passes through a line 29 to a surge tank 30 having a floating suction drain 31 which is used to remove any remaining organic which is separating from the water phase. The organic material exiting through line 31 is added to the material leaving through line 23 to be treated in the same manner as the material flowing in that line. Gases leave surge tank 30 through line 30a and are treated as the gases flowing out through lines 4a, 15, 24 and 28.

After passing through the surge tank 30, the water passes through line 32 to a pump 33 which forces it through line 34 to an activated carbon treating vessel 35 which enhances the quality of the water. After passing through the vessel 35, the water is led through a line 36 to a vaporizer 37 which employs a heating coil 38 to vaporize the water. The heating coil 38 uses a heating medium such as hot process stream or low pressure steam. Organic material which is separated from the water in the vaporizer 37 is withdrawn through line 39 and added to that withdrawn through lines 23 and 31. The vaporized water passes through line 40 to be used as stripping steam in the fractionation process.

It should be appreciated that the present invention eliminates air and water pollution. It should also be appreciated that it obviates the treatment of boiler feed water. In conventional systems, the stripping steam is generated in a boiler and then used in the fractionating tower. Subsequently, it is condensed and the condensates are purged. By utilizing boiler steam, hot process fluid or other means to revaporize, the condensate for reuse, the need for fresh boiler feed water is eliminated.

What is claimed is:

1. A plant for treating the stripping steam and odorous material carried therein after stripping a tall oil fractionating tower in a manner to reduce pollution comprising:

a conduit circuit, said circuit comprising:
a condenser for condensing said steam, said condenser having an inlet and outlet, the outlet and inlet of said condenser being connected with each other by said circuit so that condensate from said condenser is recirculated from the outlet thereof through the inlet thereof;
a purging outlet to purge from said circuit a portion of the circulating water and entrained odorous material at a rate of flow approximately equal to the rate at which said stripping steam enters said condenser;
a vaporizer connected with said purging outlet for vaporizing the condensate and entrained odorous matter coming through said outlet, to separate it from the entrained organic material;
a conduit connected between said vaporizer and said fractionating tower for directing the vapor from said vaporizer to said fractionating tower; and
means between said purging outlet and said vaporizer to separate from said odorous material and water, non-condensible gases, so that said non-condensible gases can be incinerated.

2. The plant defined in claim 1 further comprising means to separate the oil and the water phases of said mixture and remove said oil phase before said water phase is fed to said vaporizer.

3. The plant defined in claim 1 further comprising means to remove organic material from said water before said water is fed to said vaporizer.

4. The plant defined in claim 3 further comprising a surge tank connected between said means to remove organic material and said vaporizer.

5. A method of treating the mixture of stripping steam and odorous material carried therein after said steam has been used to strip tall oil being fractionated comprising the steps of:
condensing said steam continuously by heat exchange of said mixture with water,
recirculating the resulting mixture to reuse it to condense said steam,
purging a portion of said resulting mixture at a rate of flow approximately equal to the rate at which said steam is condensed,
separating non-condensible gases from said purged portion of said resulting mixture and incinerating said non-condensible gases,
vaporizing a part of said purged portion, and
using the vaporized part of said purged portion as said stripping steam.

6. The method defined in claim 5 comprising the further step of removing organic material from said purged portion before vaporizing it.

7. The method defined in claim 6 comprising the further step of separating the water and oil phases of said resulting mixture and removing said oil phase before vaporizing said water phase.

References Cited

UNITED STATES PATENTS

| | | | |
|---|---|---|---|
| 2,886,492 | 5/1959 | Hanson et al | 260—97.6 |
| 3,463,706 | 8/1969 | Randell | 202—202 |

DONALD E. CZAJA, Primary Examiner

W. E. PARKER, Assistant Examiner

U.S. Cl. X.R.

202—182, 202; 203—87, 97; 260—97.6